US009508095B2

(12) United States Patent
Stella et al.

(10) Patent No.: US 9,508,095 B2
(45) Date of Patent: Nov. 29, 2016

(54) SYSTEM AND METHOD FOR OPTIMIZING THE SELECTION OF CLOUD SERVICES BASED ON PRICE AND PERFORMANCE

(71) Applicant: FUGUE, INC., Frederick, MD (US)

(72) Inventors: Josha Stella, Shepherdstown, WV (US); Dominic Zippilli, Martinsburg, WV (US); Matthew Brinkman, Martinsburg, WV (US); Andrew Wright, Washington, DC (US); Tyler Drombosky, Washington, DC (US)

(73) Assignee: FUGUE, INC., Frederick, MD (US)

( * ) Notice: Subject to any disclaimer, the term of this patent is extended or adjusted under 35 U.S.C. 154(b) by 39 days.

(21) Appl. No.: 14/302,220

(22) Filed: Jun. 11, 2014

(65) Prior Publication Data

US 2015/0363851 A1    Dec. 17, 2015

(51) Int. Cl.
| | |
|---|---|
| G06Q 30/00 | (2012.01) |
| G06Q 30/06 | (2012.01) |
| G06F 9/50 | (2006.01) |
| G06F 11/30 | (2006.01) |
| H04L 29/08 | (2006.01) |
| H04L 29/06 | (2006.01) |

(52) U.S. Cl.
CPC ......... G06Q 30/0617 (2013.01); G06F 9/5072 (2013.01); G06F 11/3006 (2013.01); G06Q 30/0613 (2013.01); G06Q 30/0631 (2013.01); H04L 65/80 (2013.01); H04L 67/1008 (2013.01); H04L 67/125 (2013.01); H04L 67/14 (2013.01); H04L 67/327 (2013.01)

(58) Field of Classification Search
None
See application file for complete search history.

(56) References Cited

U.S. PATENT DOCUMENTS

| | | | | |
|---|---|---|---|---|
| 7,571,120 | B2* | 8/2009 | Fellenstein et al. | 705/26.3 |
| 7,739,155 | B2* | 6/2010 | Fellenstein et al. | 705/26.3 |
| 8,615,584 | B2 | 12/2013 | Dawson et al. | 709/226 |
| 8,676,621 | B1 | 3/2014 | Helfrich et al. | |
| 2003/0115123 | A1* | 6/2003 | Lang | 705/36 |
| 2010/0050172 | A1 | 2/2010 | Ferris | |
| 2010/0145864 | A1* | 6/2010 | Boesjes | 705/80 |
| 2010/0332262 | A1 | 12/2010 | Horvitz et al. | |
| 2011/0119104 | A1 | 5/2011 | Levine et al. | 705/7.25 |
| 2011/0138050 | A1 | 6/2011 | Dawson et al. | |

(Continued)

OTHER PUBLICATIONS

Cybersecurity Startup Luminal Gets $3.82M in Series A Funding. PrivateEquity.com. 2012.*

(Continued)

*Primary Examiner* — William Allen
(74) *Attorney, Agent, or Firm* — Morrison & Foerster LLP (57) ABSTRACT

A system and method is provided for generating and using purchase strategies based on the price, performance, and/or other information related to cloud services to optimize the selection of such services. The purchase strategies may comprehensively describe various cloud services in real-time so that customers may purchase cloud services using up-to-date, real-time information. The purchase strategies may, for example, describe pricing, performance, availability, and/or other attributes of various cloud services. A purchase agent may use the purchase strategies, one or more purchase rules, and/or other information to generate a purchase specification that specifies one or more cloud service instances that should be purchased. The purchase agent may leverage unique properties of spot instances to make favorable purchase decisions. For example, the system may determine bid prices that should be made to obtain certain spot instances.

32 Claims, 5 Drawing Sheets

(56) References Cited

U.S. PATENT DOCUMENTS

| | | | |
|---|---|---|---|
| 2011/0138051 A1 | 6/2011 | Dawson et al. | 709/226 |
| 2012/0016721 A1* | 1/2012 | Weinman | 705/7.35 |
| 2012/0271874 A1 | 10/2012 | Nugent | |
| 2012/0290460 A1 | 11/2012 | Curry, Jr. et al. | 705/37 |
| 2013/0031028 A1* | 1/2013 | Martin | 705/400 |
| 2013/0205020 A1 | 8/2013 | Broda et al. | |
| 2013/0346227 A1 | 12/2013 | Jain et al. | |
| 2014/0040885 A1 | 2/2014 | Donahue | |
| 2014/0067496 A1 | 3/2014 | Buswell | 705/14.4 |
| 2014/0229221 A1* | 8/2014 | Shih et al. | 705/7.23 |
| 2014/0278808 A1* | 9/2014 | Iyoob et al. | 705/7.35 |

OTHER PUBLICATIONS

Cybersecurity's new frontier: Frederick-based Luminal developing new security software McLellan, Lizzy. The Daily Record [Baltimore, Md] Apr. 23, 2014.* https://web.archive.org/web/20140401000000*/http://luminal.com [recovered from www.Archive.org on Sep. 25, 2014].*

International Search Report and Written Opinion mailed Aug. 25, 2015, directed to International Application No. PCT/US2015/034109; 20 pages.

* cited by examiner

SYSTEM AND METHOD FOR OPTIMIZING THE SELECTION OF CLOUD SERVICES BASED ON PRICE AND PERFORMANCE

FIELD OF THE INVENTION

The invention relates to a system and method for generating and using purchase strategies based on the price and/or performance of various cloud services to optimize the selection of such services.

BACKGROUND OF THE INVENTION

A number of cloud service providers sell various cloud services to execute compute instances on behalf of their customers. For example, AMAZON sells its AMAZON WEB SERVICES (AWS) service, GOOGLE sells its GOOGLE APP ENGINE service, and others sell similar services, hi exchange for a fee, AMAZON, GOOGLE, and other cloud service providers provide the use of their servers and other infrastructure to customers for a limited time in the form of a cloud service instance. The fee may vary depending on a time/date that the cloud service instance is to be run, a performance of the cloud service instance (e.g., throughput, latency, etc.), whether the offered cloud service instance is a spot instance or a standard instance, and/or other attributes.

A standard instance is a cloud service instance that is guaranteed to run to completion upon payment of the fee. A spot instance is a cloud service instance that is run so long as a customer's bid price exceeds a current spot price, which may change over time. A spot instance may be terminated early if the current spot price is raised above the bid price while the spot instance is still running. Although the provider of a spot instance will typically refund all or a portion of the bid price (or otherwise not charge all or a portion the bid price) if early termination occurs, use of spot instances may be risky for compute instances that should not be interrupted and should not experience outages. Accordingly, prices for spot instances are typically lower than for standard instances.

Because a variety of cloud services are available, each with different pricing, performance, and/other attributes, it may be difficult for a customer to make purchase decisions based on the customer's unique requirements. Furthermore, because prices, performance, and/or other attributes of a cloud service instance can vary over time, it may be difficult to make a purchase decision in real-time. It may also be difficult to leverage the unique properties of spot instances, including their inherent risk and fee structure. These and other drawbacks exist.

SUMMARY OF THE INVENTION

The invention addressing these and other drawbacks relates to a system and method for generating and using purchase strategies based on the price and/or performance of various cloud services to optimize the selection of such services. The system may be used to generate purchase strategies that comprehensively describe various cloud services in real-time so that customers may purchase cloud services using up-to-date, real-time information. The purchase strategies may, for example, describe pricing, performance, availability, and/or other attributes of various cloud services.

According to an aspect of the invention, the system may include a price and performance database that includes historical pricing, performance, and/or other information. The price and performance database may be automatically populated using processes that automatically retrieve the pricing, performance, and/or other information. Data analysts may also manually obtain pricing, performance, and/or other information used to populate the price and performance database. Such information may be obtained from news sources, market analysis performed by data analysts or others, and/or other sources.

Information from various cloud service providers, including types of resources they offer, pricing, performance, availability, and/or other information over time may also be obtained and stored in the price and performance database. The system may analyze the information from the price and performance database to find new options and capabilities for purchase within and across one or more cloud service providers. For example, the system may monitor the price and performance database for newly added or updated information, which may trigger a new analysis.

In an implementation, the system may actively collect performance data for various cloud services. The system may also collect metadata associated with customer environments to customize purchase strategies that suit a given customer's needs and/or computational environment. The system may generate one or more purchase strategies that are based on real-time and updated information in price and performance database (as well as historical information) to thereby account for historical and current cloud market conditions.

A customer may subscribe to and receive the purchase strategies, which may be applied in real-time to facilitate purchasing decisions. A purchase strategy may be provided via an asynchronous communication where strong security encryption and signing are applied. A customer (e.g., an analyst working on behalf of the customer) may modify a purchase strategy using information available to the customer, generate its own purchase strategy, provide one or more purchase rules that specify requirements for compute instances, and/or take other actions related to making a purchase decision.

A customer computer system may be provided with a purchase agent that uses one or more purchase strategies (e.g., unmodified purchase strategies, modified purchase strategies, customer-generated purchase strategies, etc.), one or more purchase rules, and/or other information to generate a purchase specification that specifies one or more cloud service instances that should be purchased using one or more purchase parameters. The purchase parameters may include, without limitation, whether a spot instance or a standard instance should be purchased, a type of cloud service instance, a time, a price, a performance, a number of cloud service instances, and/or other information related to one or more cloud service instances that should be purchased. The purchase parameters may be determined based on rules specified by the customer (e.g., a maximum price, a minimum performance, criticality—i.e., whether the compute instance to be run may be interrupted/terminated early, etc.).

The purchase agent may leverage unique properties of spot instances to make favorable purchase decisions. For example, the system may predict a bid price that is expected to result in early termination so that at least a portion of a compute instance will run rent-free.

The customer computer system may include a cloud controller that creates compute instances that are run using a cloud service. The cloud controller may periodically interact with the purchase agent so that each purchase decision performed by the cloud controller and/or the purchase agent includes an optimal pricing strategy.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

The invention is directed to a system and method for generating and using purchase strategies based on the price and/or performance of various cloud services to optimize the selection of such services.

Figure 1:
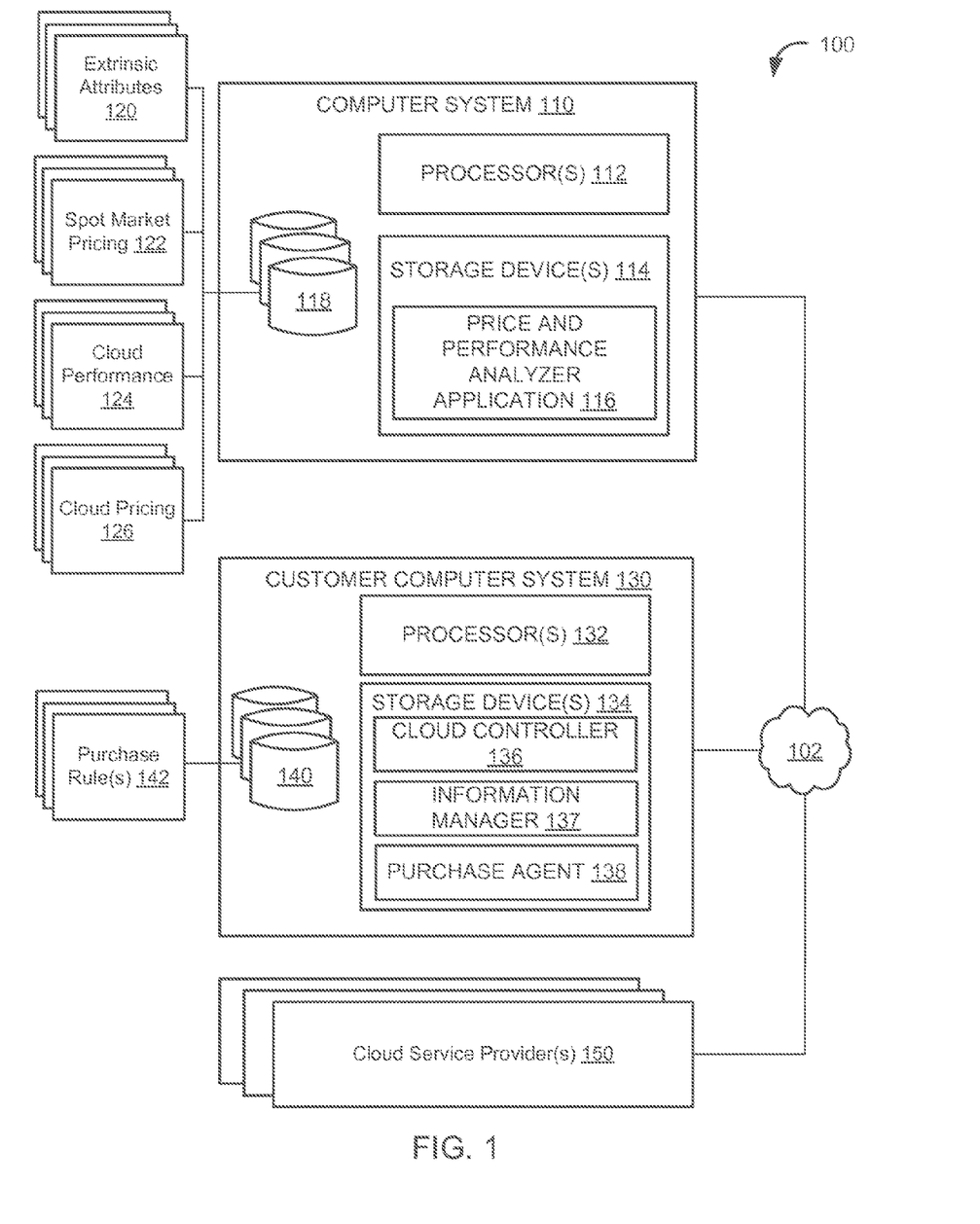
FIG. 1 illustrates a system of generating and using purchase strategies based on the price and/or performance of various cloud services to optimize the selection of such services, according to an implementation of the invention.

FIG. 1 illustrates a system 100 of generating and using purchase strategies based on the price and/or performance of various cloud services to optimize the selection of such services to satisfy computing requirements, according to an implementation of the invention.

The system may be used to generate purchase strategies that comprehensively describe various cloud services in real-time so that customers may purchase cloud services using up-to-date, real-time information. The purchase strategies may, for example, describe pricing, performance, availability, and/or other attributes of various cloud services.

Customers may subscribe to and receive the purchase strategies to make purchase decisions. A customer (e.g., an analyst working on behalf of the customer) may modify a purchase strategy using information available to the customer, generate its own purchase strategy, provide one or more purchase rules that specify requirements for compute instances, and/or take other actions related to making a purchase decision.

The system may use the purchase strategies (e.g., unmodified purchase strategies, modified purchase strategies, customer-generated purchase strategies, etc.), one or more purchase rules, and/or other information to generate a purchase specification that specifies one or more cloud services instances that should be purchased. The purchase specification may include purchase parameters that specify a time, a price, a performance, and/or other attribute related to one or more cloud service instances that should be purchased. The purchase parameters may be determined based on rules specified by the customer (e.g., a maximum price, a minimum performance, a criticality—i.e., whether the compute instance to be run may be interrupted/terminated early, etc.).

The system may leverage unique properties of spot instances to make favorable purchase decisions. For example, the system may predict a bid price that is expected to result in early termination so that at least a portion of a compute instance will run rent-free.

Other uses of system 100 are described herein and still others will be apparent to those having skill in the art. Having described a high level overview of some of the system functions, attention will now be turned to various system components that facilitate these and other functions.

Exemplary System Architecture

System 100 may include a computer system 110, a customer computer system 130, one or more cloud service providers 150, and/or other components.

Computer System 110

Computer system 110 may include one or more processors 112 (also interchangeably referred to herein as processors 112, processor(s) 112, or processor 112 for convenience), one or more storage devices 114 (which may store a price and performance analyzer application 116, hereinafter "PPA 116" for convenience), one or more price and performance databases 118, and/or other components. Processors 112 may, be programmed by one or more computer program instructions. For example, processors 112 may be programmed by PPA 116 and/or other instructions.

Customer Computer System 130

Customer computer system 130 may include one or more processors 132 (also interchangeably referred to herein as processors 132, processor(s) 132, or processor 132 for convenience), one or more storage devices 134 (which may store a cloud controller 136, an information manager 137, a purchase agent 138, and/or other instructions), a customer data repository 140, and/or other components. Processors 132 may be programmed by one or more computer program instructions. For example, processors 132 may be programmed by cloud controller 136, information manager 137, purchase agent 138, and/or other instructions.

Cloud Service Providers 150

Cloud service providers 150 may include entities that sell various cloud services to execute compute instances on behalf of their customers. For example, AMAZON sells cloud service instances using its AMAZON WEB SERVICES (AWS) service, and GOOGLE sells cloud service instances using its GOGGLE APP ENGINE service.

Cloud service providers 150 may also include entities that provide markets, or exchanges, for cloud services. For example, cloud service providers 150 may include markets that sell cloud service instances on behalf of others that actually provide the cloud service instances using their infrastructure. In this manner, system 100 may leverage exchanges that may sell various cloud service instances from different entities.

Although illustrated in FIG. 1 as a single component, computer system 110 and customer computer system 130 may each include a plurality of individual components (e.g., computer devices) each programmed with at least some of the functions described herein. In this manner, some components of computer system 110 and/or customer computer system 130 may perform some functions while other components may perform other functions, as would be appreciated. The one or more processors 112, 132 may each include one or more physical processors that are programmed by computer program instructions. The various instructions described herein are exemplary only. Other configurations and numbers of instructions may be used, so long as the processor(s) 112, 132 are programmed to perform the functions described herein.

Furthermore, it should be appreciated that although the various instructions are illustrated in FIG. 1 as being co-located within a single processing unit, in implementations in which processor(s) 112, 132 includes multiple processing units, one or more instructions may be executed remotely from the other instructions. In addition, at least some of the functions described herein with respect to processor(s) 112 may be performed by processor(s) 132, and vice versa. For example, processor(s) 112 may be programmed by purchase agent 138 and/or cloud controller 136. In the foregoing example, customer computer system 130 may obtain purchase decisions from computer system 110.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the instructions.

The various instructions described herein may be stored in a storage device 114, which may comprise random access memory (RAM), read only memory (ROM), and/or other memory. The storage device may store the computer program instructions (e.g., the aforementioned instructions) to be executed by processor 112 as well as data that may be manipulated by processor 112. The storage device may comprise floppy disks, hard disks, optical disks, tapes, or other storage media for storing computer-executable instructions and/or data.

The various components illustrated in FIG. 1 may be coupled to at least one other component via a network 102, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1 and other drawing Figures, different numbers of entities than depicted may be used. Furthermore, according to various implementations, the components described herein may be implemented in hardware and/or software that configure hardware.

The various databases 160 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Generating Purchase Strategies

In an implementation, PPA 116 may program the processors 112 (and therefore computer system 110) to generate one or more purchase strategies based on the price, performance, and/or other characteristics of various cloud services. As used hereinafter, for convenience, the various instructions will be described as performing an operation, when, in fact, the various instructions program the processors 112 to perform the operation. A given purchase strategy may be formatted using JAVASCRIPT Object Notation (JSON), eXtensible Markup Language (XML), and/or other format that can be exchanged.

In general, a purchase strategy may include an integrated set of historical and/or real-time cloud attributes that describes one or more cloud services and/or one or more cloud service providers 150. Customers may use a purchase strategy to identify one or more cloud services that should be purchased to run their compute instances and/or one or more cloud service providers 150 from which to purchase the cloud services. Because a purchase strategy may describe cloud attributes of a variety of cloud services and/or cloud service providers 150, customers may make informed purchase decisions that take into account a range of different services and providers (and their associated cloud attributes).

Examples of cloud attributes may include, without limitation, extrinsic attributes 120, spot market pricing 122, cloud performance 124, cloud pricing 126, and/or other characteristics that describe a given cloud service and/or cloud service provider 150.

In an implementation, extrinsic attributes 120 may include information that describes news events or third party assessments of a cloud service and/or a cloud service provider 150. For example, and without limitation, extrinsic attributes 120 may include news items, reviews/ratings, and/or other information that describes a cloud service and/or cloud service provider 150. The news items may generally relate to cloud services or providers (e.g., a news item that indicates the price of cloud services have generally fallen due to competition) or specifically relate to a particular cloud service or provider (e.g., a particular cloud service provider 150 has added a new compute farm to handle a greater number of cloud service requests). The reviews and ratings may be from customers that have used the cloud service, an analyst that works for an entity that operates computer system 110, and/or other reviewer. PPA 116 may include such reviews and ratings into a purchase strategy.

In an implementation, spot market pricing attributes 122 may describe spot instances that are available from one or more cloud service providers 150. The spot market pricing attributes 122 may include, without limitation, spot prices, bids placed by customers, and/or other information. The spot market pricing attributes 122 may include real-time and/or historical information associated with a date/time.

In an implementation, cloud performance attributes 124 may describe the performance of one or more cloud services. For example, and without limitation, cloud performance attributes 124 may include throughput/capacity, latency, availability, maximum packet loss, and/or other performance metrics.

Cloud performance attributes 124 may be obtained from cloud service provider 150 (or other entity), and/or may be measured by PPA 116. In an implementation, PPA 116 may measure the performance of various cloud service providers 150 (and their respective services) to sample their performance. For example, PPA 116 may employ a performance testing facility that pings or otherwise sends requests to various cloud services to measure the throughput, response time, latency, and/or other performance metrics. PPA 116 may periodically measure the performance at different times such as throughout different times of the day, different days of the week, etc. In this manner, PPA 116 may directly gauge the performance attributes of various cloud services and/or cloud service providers 150 so that such performance attributes may be used to generate a purchase strategy. The directly measured performance attributes may be used instead of or in addition to performance attributes obtained from other sources.

In an implementation, cloud pricing attributes 126 may include standard prices for cloud service instances that are not spot instances. Unlike a spot price, a standard price (if paid) guarantees that a compute instance will be run until a pre-specified compute time has elapsed.

PPA 116 may obtain and store real-time cloud attributes so that the purchase strategies reflect real-time information (e.g., real-time pricing and performance information that is streamed and/or periodically obtained). Alternatively or additionally, PPA 116 may obtain and store historical cloud attributes so that the purchase strategies reflect trends, patterns, and/or other information associated with historical cloud attributes.

PPA 116 may store the cloud attributes in price and performance database 118. PPA 116 may periodically (and/or on a real-time basis) update price and performance database 118 so that purchase strategies generated using the database reflect current information. In this manner, price and performance database 118 may serve as a real-time and historical repository for information used to generate a purchase strategy.

In an implementation, PPA 116 may continuously mine price and performance database 118 to identify individual cloud services and/or combinations of cloud services that may be suitable for purchase. For example, PPA 116 may determine that, to achieve a given level of performance (e.g., throughput), a certain combination of cloud services could be used to minimize the prices of such cloud service(s) or to otherwise be at or below a certain price. PPA 116 may also repeat the foregoing analysis for other types of performance as well. In this manner, a purchase strategy may include an analysis of the cloud attributes.

Providing Purchase Strategies

PPA 116 may provide one or more purchase strategies to customers that purchase and consume cloud services so that they may optimize the selection of such services to satisfy their computing requirements. PPA 116 may provide one or more purchase strategies on a one-time basis or a subscription basis. For example, a customer may obtain one or more purchase strategies on a one-time basis by making a request (e.g., via a website or other interface) to PPA 116 to provide the purchase strategies, which may be generated on-demand responsive to the request or retrieved from a memory. In another example, a customer may subscribe to and receive one or more purchase strategies, which may be automatically provided to the customer at periodic intervals, when updated information is available, and/or at other times.

In an implementation, computer system 110 may charge an access fee for the one or more purchase strategies. For example, computer system 110 may charge a one-time fee, a subscription fee, and/or other types of access fees. Furthermore, different access fees may be charged depending on the cloud attributes included in a given purchase strategy. For example, a purchase strategy that includes all historical price information may be charged a higher fee than a purchase strategy that includes only some (e.g., the last two weeks) of the historical price information. In an implementation, each type of cloud attribute information may be associated with its own fee. For example, a separate fee may be assessed for measured performance metrics. The access fee may be based other levels of cloud attributes included in a purchase strategy as well. In this manner, a customer may select particular information of interest and/or how much information should be provided in association with a given request or subscription.

Specifying Compute Instance Parameters

Cloud controller 136 may generate one or more compute instances, which may be run locally and/or using one or more cloud services provided by one or more cloud service providers 150. For example, in a system that continuously replaces compute instances with other compute instances to ensure the security of a given compute instance, cloud controller 136 may create a plurality of compute instances and schedule one or more of the compute instances to run on cloud services. Such a system of replacing software components has been described in co-owned U.S. patent application Ser. No. 13/969,181, entitled "System and Method for Replacing Software Components With Corresponding Known-Good Software Components Without Regard to Whether the Software Components Have Been Comprised or Potentially Compromised," filed on Aug. 16, 2013, which is hereby incorporated by reference herein in its entirety.

A given compute instance may be associated with one or more computational parameters that describe what is required and/or desired to run a compute instance. Examples of computational parameters include, without limitation, a compute duration (e.g., a length of time that a compute instance should or is expected to run), a time and/or date when a compute instance should run, an indication of whether a compute instance should not be interrupted (e.g., whether the compute instance is mission-critical, optional, etc.), a level of performance (e.g., bandwidth, latency, etc.) that is necessary or desired of a cloud service that runs the compute instance, a pricing associated with the cloud service, and/or other descriptions of what is needed or desired to run the compute instance.

In an implementation, the computational parameters may be classified as hard computational parameters that must be met or soft computational parameters that are desirable but need not necessarily be met. Hard computational parameters may specify thresholds that must be met. For example, and without limitation, a hard computational parameter may specify a minimum bandwidth that is required to run a corresponding compute instance or a maximum latency. On the other hand, a soft computational parameter may specify that a certain bandwidth is desirable, but not necessary. Whether a computational parameter is classified as a hard or soft parameter, the computational parameter may specify a range of values (e.g., a range of prices that are acceptable).

One or more users (e.g., an analyst working on behalf of the customer) and/or cloud controller 136 (e.g., automatically without user intervention) may determine the computational parameters. In an implementation, the computational parameters may be determined specifically for a particular compute instance (or given type of compute instance). For example, a server instance that handles HTTP requests may be associated with a first set of one or more computational parameters while an application instance that provides file transfer requests may be associated with a second set of one or more computational parameters. In this manner, different compute instances may be associated with their own set of one or more computational parameters. In an implementation, the computational parameters may be determined generally for all compute instances of the customer.

Managing Information Used to Make Purchase Decisions

Information manager 137 may manage purchase decision information, which may be stored in and retrieved from customer data repository 140 and/or other storage. The purchase decision information may be used by a customer to make purchase decisions and may include, without limitation, one or more purchase strategies, one or more purchase rules (e.g., that specify computational parameters), and/or other information used to make purchase decisions.

In an implementation, information manager 137 may subscribe to and obtain one or more purchase strategies from computer system 110. The subscription may be an asynchronous communication where strong security encryption and signing are applied. The purchase strategies may be stored in customer data repository 140 and/or other storage. The customer (e.g., an analyst working on behalf of an entity that operates customer computer system 130) may modify, delete, or leave intact a purchase strategy from computer system 110. For example, the customer may modify one or more of the cloud attributes based on the customer's experience with a given cloud service, blacklist (or whitelist) certain cloud services or cloud service providers 150, and/or otherwise modify a given purchase strategy from computer system 110.

In this manner, a customer may customize purchase strategies according to information it believes may enhance or otherwise modify a purchase strategy received from computer system 110. In an implementation, information manager 137 may obtain real-time information such as performance attributes, price attributes, and/or other information to augment or otherwise update the purchase strategies received from computer system 110.

In an implementation, information manager 137 may receive and store customer purchase strategies from the customer. A customer purchase strategy may include some or all of the cloud attributes that are provided in a purchase strategy provided by computer system 110. In this respect, a customer purchase strategy may differ from a purchase strategy provided by computer system 110 only in that the customer creates a customer purchase strategy. A customer purchase strategy may be used instead of or in addition to a purchase strategy provided by computer system 110.

In an implementation, information manager 137 may store one or more purchase rules 142 that specify one or more computational parameters. Different purchase rules may specify different sets of one or more computational parameters. For example, a first purchase rule may specify that for certain hosted applications, a minimum bandwidth and maximum latency should be purchased irrespective of cost (e.g., bandwidth and latency should be optimized). A second purchase rule may specify that for certain background processing, a price should not exceed a maximum price (e.g., price should be optimized). Other examples of purchase rules that include different sets of computational parameters may be used as well, according to particular needs of a customer.

Information manager 137 may receive a weight for a given cloud attribute. For example, the customer may specify a cloud attribute that should be weighted more heavily than another cloud attribute when making a purchase decision. A given weight may be encoded in one or more purchase rules 142 in association with a corresponding cloud attribute.

Making Cloud Service Purchase Decisions

Purchase agent 138 may generate a purchase specification based on one or more cloud attributes described in a given purchase strategy (which may include an unmodified purchase strategy from computer system 110, a purchase strategy from computer system 110 that is modified by the customer, a customer purchase strategy, etc.), one or more purchase rules, and/or other information. A purchase strategy may include one or more purchase parameters that specify the purchase of one or more cloud services to run one or more compute instances desired by the customer. The purchase parameters may include, without limitation, a time at which a compute instance should be run, a type of cloud service that should be used (e.g., a spot market resource, a non-spot market resource, etc.), a price to be paid, a bid that should be placed, an identity of a cloud service provider 150 that should be used, an increment of computing time that should be purchased, a number of compute instances that should be purchased, and/or other purchase parameters.

The purchase parameters may be determined based on real-time information such that real-time pricing, performance, and/or other conditions may be taken into account when generating a purchase specification.

In an implementation, purchase agent 138 may determine one or more purchase parameters based on an optimization of one or more cloud attributes. By way of illustration and not limitation, price and/or performance will be used in the description that follows, although other cloud attributes may be optimized as well.

Purchase agent 138 may optimize one or more cloud attributes by reviewing the available cloud services (e.g., as described in the purchase strategies in customer data repository 140) and generating sets of one or more cloud services that will be considered for purchase. Purchase agent 138 may assess each of the sets of cloud services to identify optimal sets of cloud services. Each set of one or more cloud services may include cloud services provided by one or more cloud service providers 150. In some instances, for example, a set of one or more cloud services may include cloud services from a first cloud service provider 150 and cloud services from a second cloud service provider 150.

In an implementation, purchase agent 138 may determine whether a cloud service should be included in a given set of cloud services for consideration based on one or more purchase rules. For example, a purchase rule may specify that a particular compute instance is critical and therefore should not be subject to termination. Based on the foregoing rule, purchase agent 138 may not consider spot instances (which are subject to termination) and therefore spot instances will not be used in any purchase specifications for the particular compute instance. On the other hand, absent such a purchase rule, purchase agent 138 may consider spot instances (along with other compute instances) to potentially determine a mix of cloud services to run the compute instance.

As previously described, each cloud service may be associated with various cloud attributes. For example, a given cloud service may be associated with a price, a performance, a time that the offered cloud service will be executed, and/or other cloud attribute. Purchase agent 138 may rank the sets of one or more cloud services with respect to one another based on their respective cloud attributes. In an implementation, purchase agent 138 may provide the highest ranking set (or N highest ranking sets) to the customer for selection. Alternatively, purchase agent 138 may automatically select the highest ranking set to serve as the basis for the cloud services to be purchased.

To rank a set of one or more cloud services with respect to another set, purchase agent 138 may perform single objective optimization using a single cloud attribute and/or multi-objective optimization using multiple cloud attributes.

In single objective optimization, a single cloud attribute may be optimized. For example, purchase agent 138 may rank sets of cloud services by performance. In other words, the expected performance of each set of cloud services may be determined and ranked with respect to other sets of cloud services. For a set of cloud services that includes more than one cloud service, the performance of the set may be determined by averaging the performance of each.

In multi-objective optimization, more than one cloud attribute may be optimized. For example, purchase agent 138 may rank sets of cloud services by performance and price. Purchase agent 138 may determine whether a customer has specified any weights for the cloud attributes. For example, the customer may specify that performance should be weighted 1.2 times higher than price (e.g., the customer values performance over price). Other expressions of weights may be used as well. If the customer has weighted any of the cloud attributes, purchase agent 138 may take the weights into account when ranking the sets of cloud services.

In an implementation, purchase agent 138 may use conventional multi-objective optimization algorithms to determine optimal sets of cloud attributes. The results of such optimization may include a range of optimal combinations of multiple cloud attributes. For example, optimal combinations of price and performance and corresponding cloud service(s) may be identified. Purchase agent 138 may present a range of optimal combinations to allow the customer to select a suitable set of cloud services to purchase. Alternatively, purchase agent 138 may automatically select a given combination determined to be optimal.

In an implementation, purchase agent 138 may analyze one or more purchase strategies to determine patterns in various cloud attributes. For example, purchase agent 138 may determine that prices tend to fall (or rise or remain stable) for certain types of cloud services during certain times of the day, certain days of the week, etc. Likewise, purchase agent 138 may determine that performance tends to increase (or decrease or remain stable) for certain types of cloud services during certain times of the day, certain days of the week, etc. Other types of patterns may be determined as well. Using the patterns, purchase agent 138 may determine appropriate times at which cloud services should be ordered. For example, if prices tend to fall during late evening hours, then a cloud service instance associated with late evening hours may be purchased to run compute instances (for those compute instance that can be run at any time).

Identifying and Leveraging Spot Market Stability and Volatility

In a particular implementation, purchase agent 138 may analyze spot market prices and determine patterns in spot prices, such as spot price stability or volatility. Purchase agent 138 may leverage spot price stability and/or volatility based on an indication to do so from a customer (e.g., via purchase rules), automatically based on computational requirements of a compute instance, and/or other information.

Spot price stability may be defined by a range of spot prices that is bounded by a lower bound spot price and an upper bound spot price. Conversely, spot price volatility may be defined by periods in which spot prices fluctuate by a predefined amount (e.g., above the range of spot prices and/or other amount, which may include a threshold amount, a certain percentage of price fluctuation, etc.). The range may be predetermined and/or configured dynamically such that the definition of spot price stability and/or spot price volatility may be adjusted.

Spot price stability may indicate that supply and demand for spot instances are relatively stable and that compute instances associated with winning bids will not be terminated. In other words, the spot price is not expected to rise above a winning bid that is placed during periods of spot price stability (assuming that a compute instance is expected to run to completion before the period of spot price stability expires).

On the other hand, spot price volatility may indicate that supply and demand for spot instances are not stable and that compute instances associated with winning bids are subject to a higher risk of being terminated than compute instances initiated during spot price stability. In other words, the spot price is expected to potentially rise above a winning bid that is placed during periods of spot price volatility and therefore the compute instance associated with the winning bid is subject to a risk of termination.

Purchase agent 138 may use the determined patterns of spot price stability and/or volatility when generating a purchase decision. For example, purchase agent 138 may use spot instances when they would otherwise not be considered due to the risk of early termination. Purchase agent 138 may determine a bid price that is at or above the upper bound spot price during a period of spot price stability, thereby decreasing the likelihood that a corresponding spot instance will be terminated early. In this manner, purchase agent 138 may leverage potentially lower spot prices for spot instances (as opposed to higher prices for standard instances) while maintaining a level confidence that the spot instance will run to completion during times of spot price stability. Thus, even potentially more critical compute instances may be able to take advantage of spot instances, which would otherwise be too risky to use.

In an extension of the foregoing example, purchase agent 138 may identify the lowest spot price that is expected to remain above then-prevailing spot prices. For example, purchase agent 138 may periods of price stability having the lowest upper bound spot price. Such periods may represent the lowest spot prices that can be achieved while running a spot instance to completion.

In another example, purchase agent 138 may determine times when spot prices are expected to increase based on spot price volatility. Purchase agent 138 may determine a bid price that is expected to be higher than a first spot price at a first time but be lower than a second spot price at a second time. In this case, a compute instance associated with the bid price may be run as a spot instance, starting from the first time (less processing time for completing the purchase and initiating the spot instance) through the second time, at which point the spot instance will be prematurely terminated because the bid price no longer exceeds the current spot price.

The compute instance would have run essentially without a fee from the cloud service provider 150 because the spot instance was terminated early by the cloud service provider 150. The customer can leverage such early termination by running a compute instance that can be easily replaced with another compute instance upon termination or otherwise obtain "free" compute cycles before the premature termination (subject to any appropriate terms of service or other provision of the cloud service provider).

Upon premature termination (e.g., as monitored by purchase agent 138 and/or cloud controller 136), purchase agent 138 may use other cloud service instances to fill any remaining compute time that is needed to finish processing the compute instance. For example, purchase agent 138 may identify a substitute cloud service instance to use if and when premature termination occurs. A substitute cloud service instance may be identified before and/or after such premature termination.

Types and Combinations of Cloud Service Instances

In an implementation, using one or more optimizations, patterns, trends, price stability, and/or other information described herein, purchase agent 138 may determine that a compute instance should be run using a combination of cloud service instances. Purchase agent 138 may determine that one or more cloud attributes may be optimized by using more than one cloud service instance. For example, purchase agent 138 may determine that the lowest price to obtain a certain level of throughput or other performance metric may be achieved by using multiple cloud service instances that together satisfy the required level of throughput. Put another way, purchase agent 138 may determine that a single cloud service instance that is able to handle the required level of throughput alone would be more expensive. On the other hand, purchase agent 138 may, depending on pricing information (e.g., obtained from a purchase strategy), determine that a single cloud service instance should be used instead.

In an implementation, using one or more optimizations, patterns, trends, price stability, and/or other information described herein, purchase agent 138 may determine that a certain type of cloud service instance should be used. For example, purchase agent 138 may determine whether a compute instance may be potentially prematurely terminated (e.g., is not mission critical). If not, purchase agent 138 may determine that spot instances should be considered. Otherwise, purchase agent 138 may consider spot instances when generating a purchase specification.

In an implementation, purchase agent 138 may restrict types of cloud service instances that should be used. For example, via purchase rules, a customer may specify that only spot instances should be used, only standard instances should be used, other cloud service instances should be used, or combinations of different types of cloud service instances should be used. In this manner, purchase agent 138 may use only certain types of cloud service instances. Likewise, cloud service providers 150 may be blacklisted and/or whitelisted.

Purchase agent 138 may generate one or more purchase orders to facilitate the purchase of cloud services. Because a purchase specification may include purchase parameters that relate to running a compute instance on more than one cloud service instances (which may be provided by more than one cloud service provider 150), purchase agent 138 may generate multiple purchase orders based on the purchase specification.

Purchase agent 138 and/or cloud controller 136 may provide the purchase orders to the customer so that the customer makes the orders. Alternatively or additionally, purchase agent 138 and/or cloud controller 136 may automatically interface with the cloud service providers 150 to procure and monitor the cloud services.

It should be understood that the optimizations and purchase decisions described with respect purchase agent 138 may be applied to PPA 116. For example, PPA 116 may provide purchase strategies that already include one or more optimized cloud attributes such that the customer may simply select a purchase decision from the purchase strategies.

Figure 2:
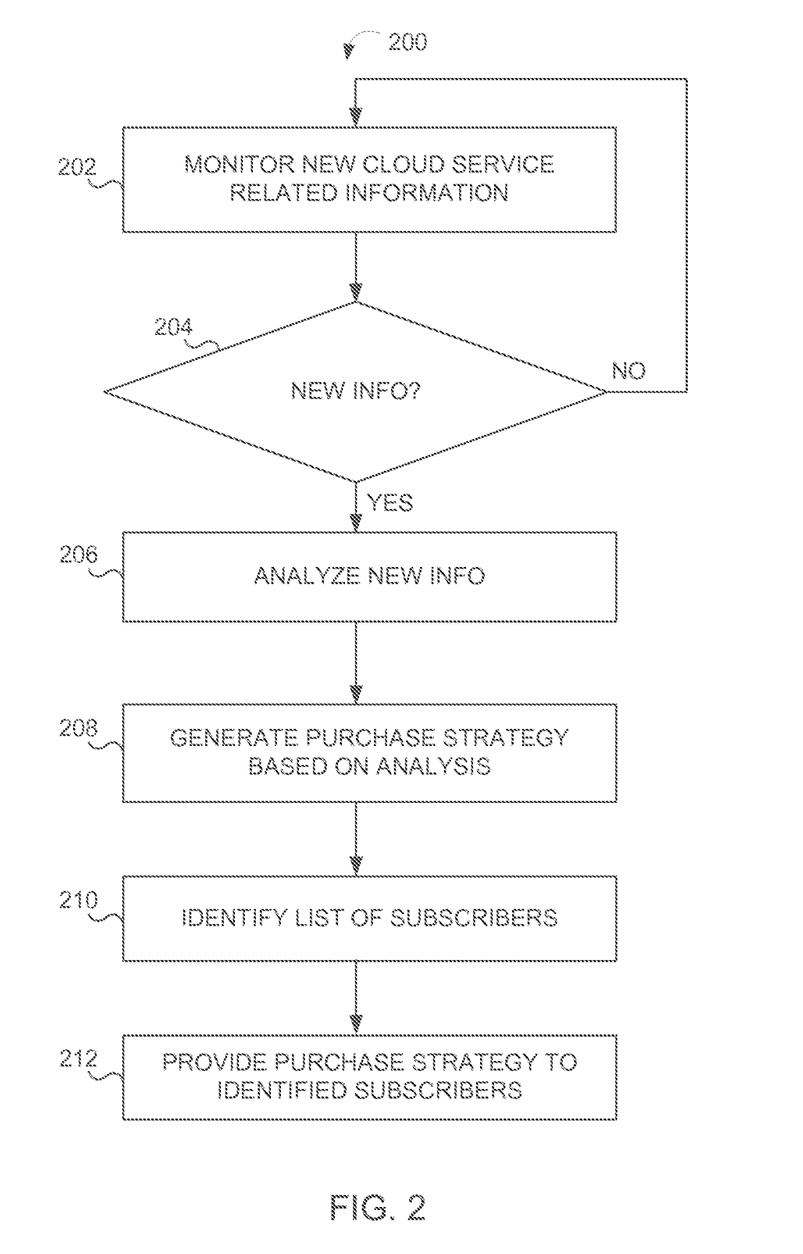
FIG. 2 illustrates a data flow diagram of generating and using purchase strategies based on the price and/or performance of various cloud services to optimize the selection of such services, according to an implementation of the invention.

FIG. 2 illustrates a process 200 of generating and providing purchase strategies based on the price and/or performance of various cloud services, according to an implementation of the invention. The various processing operations and/or data flows depicted in FIG. 2 are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 202, new information related to cloud services may be monitored. Information related to cloud services may include, without limitation, extrinsic attributes, spot market pricing, cloud performance, cloud pricing, and/or other characteristics of cloud services. The information related to cloud services may be updated in real-time as it is made available by various sources that provide the information. Such sources may include, without limitation, analysts, third party entities (e.g., news or ratings services), cloud service providers, and/or others.

In an operation 204, a determination of whether new information is available may be made. If no new information is obtained, process 200 may return to operation 202.

On the other hand, if new information is obtained, in an operation 206, the new information may be analyzed. The analysis may include, without limitation, ranking cloud attributes such as pricing, performance, and/or other cloud attributes included in the information. In this manner, different cloud services and their associated attributes may be compared to one another to facilitate selection of appropriate cloud services.

In an operation 208, one or more purchase strategies may be generated based on the information related to the cloud services and/or the analysis. Different types of purchase strategies may be generated. For example, a purchase strategy may include raw information that includes the cloud attributes. In this manner, a purchase strategy may include a listing of different cloud services and their attributes. A purchase strategy may include rankings of different cloud services. Rankings may be based on, without limitation, price per unit of performance, price irrespective of performance, performance irrespective of price, and/or other ranking criteria. In this manner, a purchase strategy may be augmented with information that allows a customer to select appropriate cloud services to purchase based on attributes that are most important to the customer. A purchase strategy may include optimizations of certain cloud attributes. For example, a purchase strategy may include sets of cloud services that are optimized by price, performance, and/or other cloud attribute. A purchase strategy may include only certain information. For example, a purchase strategy may include information for only spot instances, only for standard instances, only for certain cloud service providers, and/or other filter criteria.

In an operation 210, a list of subscribers may be identified. Different levels of subscriptions may be associated with different levels of information that is provided in a purchase strategy. For example, a basic subscription may provide a purchase strategy that includes only raw information. An augmented subscription may provide a purchase strategy that includes ranked and/or optimized information. Other provisioning models may be used as well, including one-time requests for purchase strategies. In an operation 212, the purchase strategies may be provided to the subscribers (e.g., via an asynchronous, cryptographically signed communication).

Figure 3:
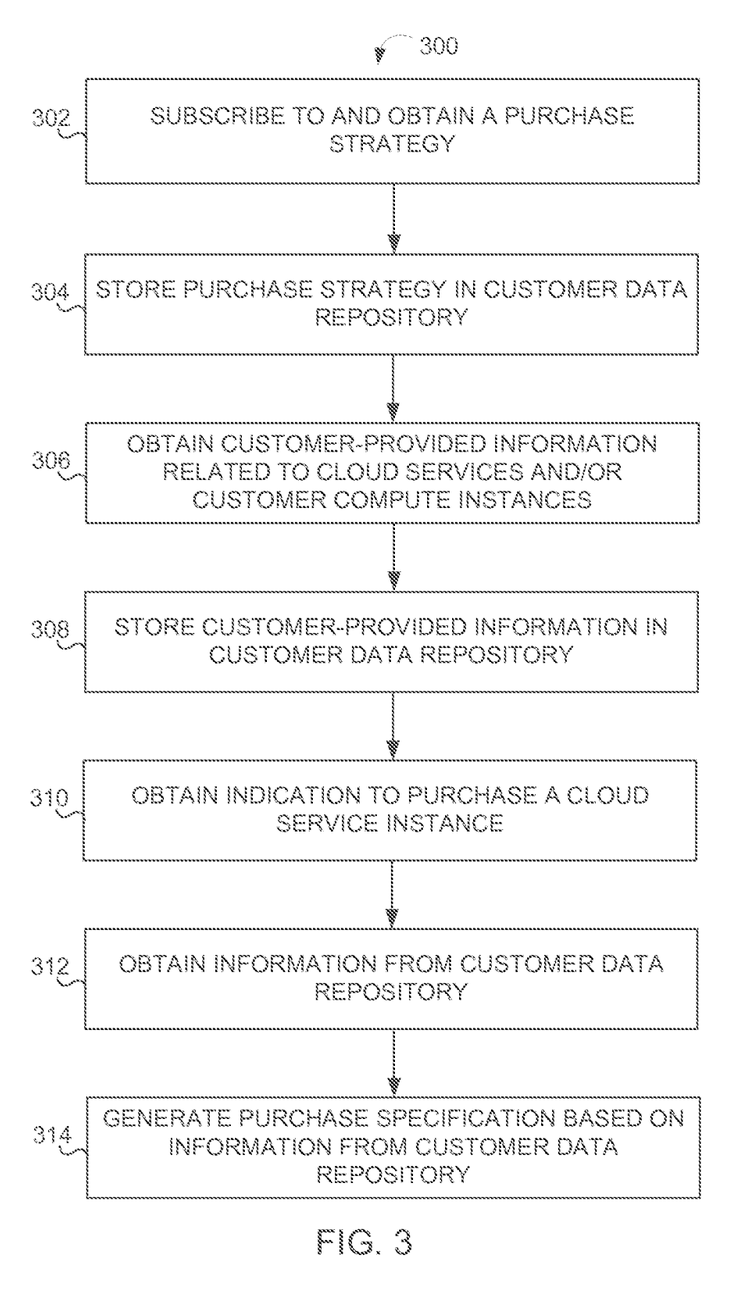
FIG. 3 illustrates a process of determining purchase decisions based on purchase strategies and/or other information, according to an implementation of the invention.

FIG. 3 illustrates a process 300 of determining purchase decisions based on purchase strategies and/or other information, according to an implementation of the invention. The various processing operations and/or data flows depicted in FIG. 3 are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 302, one or more purchase strategies may be subscribed to and obtained.

In an operation 304, one or more purchase strategies may be stored in a customer data repository (such as customer data repository 140 illustrated in FIG. 1).

In an operation 306, customer-provided information may be obtained. The customer-provided information may include, without limitation, customization or modifications made to one or more purchase strategies, customer purchase strategies (which are generated by the customer), one or more purchase rules used to specify requirements to be satisfied when making a cloud service purchase decision, and/or other information provided by the customer.

In an operation 308, the customer-provided information may be stored in the customer data repository.

In an operation 310, an indication to purchase a cloud service instance may be obtained. For example, a cloud controller may create new compute instances to be run and/or a customer may otherwise wish to purchase one or more cloud service instances to run a compute instance.

In an operation 312, information from the customer data repository may be obtained. For example, a purchase strategy, a customer-modified purchase strategy, a customer purchase strategy, a purchase rule, and/or other information may be obtained from the customer data repository. Other information may be obtained as well, such as real-time pricing or performance information obtained or determined by process 300.

In an operation 314, a purchase specification may be generated based on the information from the customer data repository and/or other information obtained or determined by process 300. A purchase specification may include one or more purchase parameters that describe a cloud service instance to be purchased.

Figure 4:
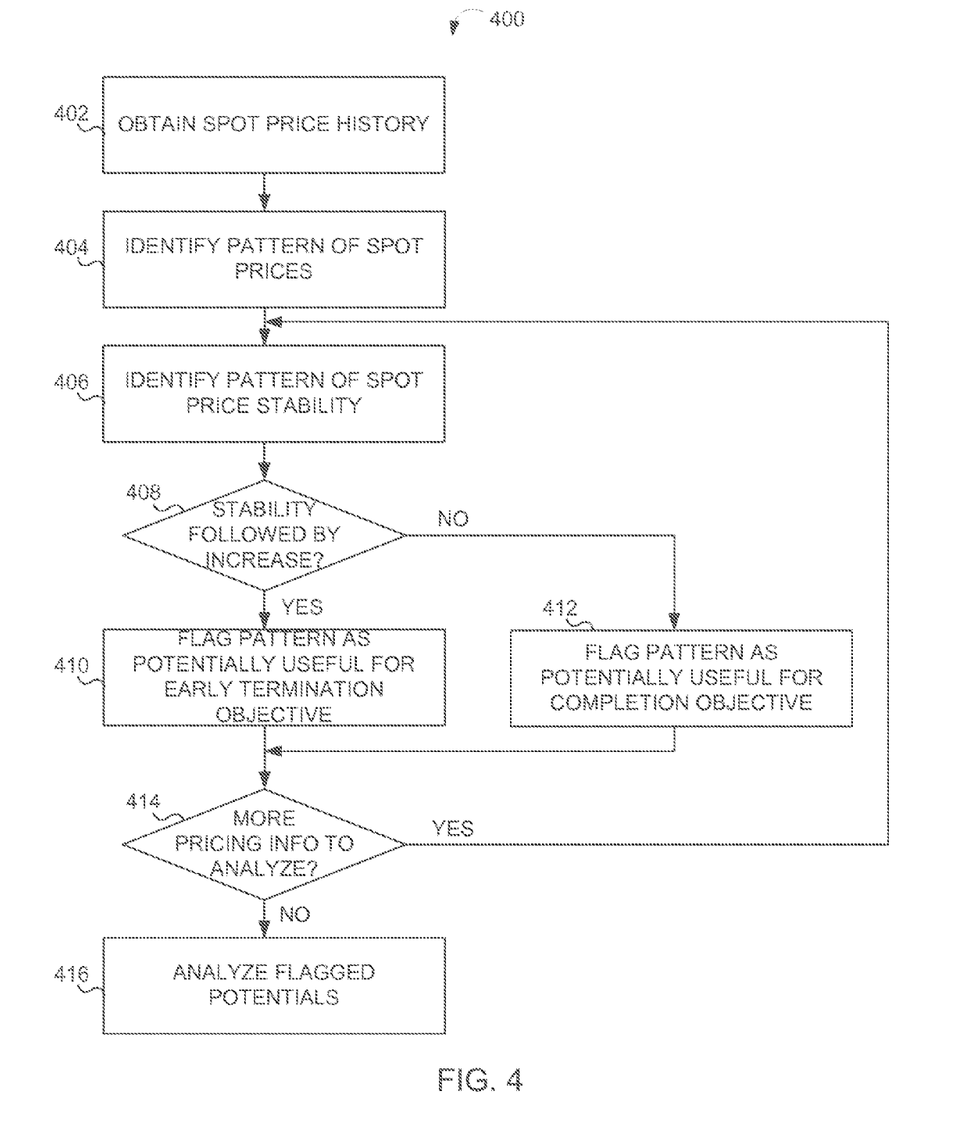
FIG. 4 illustrates a process of identifying and leveraging spot price volatility for spot instances, according to an implementation of the invention.

FIG. 4 illustrates a process 400 of identifying and leveraging spot price volatility for spot instances, according to an implementation of the invention. The various processing operations and/or data flows depicted in FIG. 4 are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 402, a spot price history may be obtained. The spot price history may include a listing a spot prices that were offered by a provider of spot instances, bids that were placed, and/or other information related to spot prices.

In an operation 404, a pattern of spot prices may be identified based on whether one or more spot prices tend to be repeated. For example, a pattern may be identified when a first spot price is offered at a first time and a second spot price substantially the same as the first spot price is offered at a second time after the first time. The second spot price may be substantially the same as the first spot price when a difference between the first spot price and the second spot price does not exceed a certain amount. Other patterns may be determined as well, such as price increases or decreases that tend to occur at regular times (e.g., price declines at certain times of the day or price increases at other times of the day).

In an operation 406, a pattern of spot price stability may be identified based on the pattern of spot prices. In other words, spot price stability that tends to be repeated at, for example, certain times of the day. Spot price stability refers to a period of time in which a spot price does not go below a lower bound spot price and does not rise above an upper bound spot price. For example, referring to FIG. 5, a spot price stability may be identified at between times ($T_1$) and ($T_2$), because the spot price ranges between lower bound spot price ($P_1$) and upper bound spot price ($P_2$). A pattern of such spot price stability may be identified when such stability is repeated during another period of time. For example, a pattern of spot price stability may occur every evening at a certain time.

Referring back to FIG. 4, in an operation 408, a determination of whether the spot price stability is followed by a price increase (beyond the upper bound spot price) is made. If the spot price stability is followed by a price increase, then the spot price stability and price increase may be flagged as a potential for early termination of a spot instance in an operation 410. On the other hand, if the spot price stability is not followed by a price increase (and therefore must be followed by a price decrease below the lower bound spot price), then the spot price stability and price decrease may be flagged as a potential for completion of a spot instance in an operation 412.

In an operation 414, a determination of whether more spot prices are available for analysis may be made. If more spot prices are available for analysis, then process 400 may return to operation 406, where periods of price stability may be identified.

Otherwise, the flagged potentials may be analyzed in an operation 416. Depending on the objective of a purchase decision, an appropriate potential may be selected. For example, if an objective is to leverage early termination to obtain free compute cycles, then price stability followed by price increases may be selected for analysis, if a price increases after a period of price stability, then it is likely that a spot instance resulting from a bid that was placed and accepted during a period of price stability will be terminated early when the price increases beyond the bid (assuming that the spot instance is scheduled to run to completion after the price increase). A time and bid amount may be determined based on the expected runtime (e.g., the duration of time in which the spot instance is to run), the period of stability, and the price increase.

On the other hand, if an objective is to leverage spot instance completion to use spot prices that may be lower than standard prices, then price stability followed by price decreases may be selected for analysis. If a price decreases after a period of price stability, then it is likely that a spot instance resulting from a bid that was placed and accepted during a period of price stability will run to completion even when the price decreases below the bid (assuming that the spot price does not subsequently increase beyond the bid before the spot instance runs to completion). A time and bid amount may be determined based on the expected runtime (e.g., the duration of time in which the spot instance is to run), the period of stability, and the price decrease.

Figure 5:
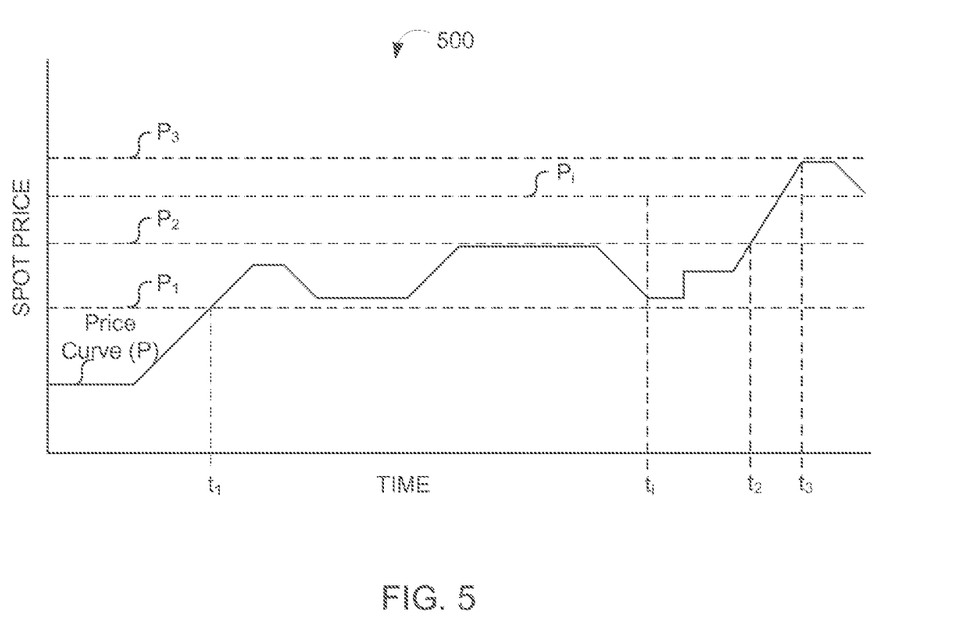
FIG. 5 illustrates a two-dimensional graphical representation of spot prices for spot instances plotted over time, according to an implementation of the invention.

FIG. 5 illustrates an exemplary two-dimensional graphical representation 500 of spot prices for spot instances plotted over time, according to an implementation of the invention. The two-dimensional graphical representation 500 is provided for illustrative purposes to depect an analytical framework for determining one or more purchase parameters based on a price curve (P). Other types of cloud attributes (e.g., standard prices, performance, etc.) may be analyzed in a similar manner to determine one or more purchase parameters.

A period of price stability occurs between time $t_1$ and $t_2$ because the spot price (P) falls within a range of prices bounded by ($P_1$) and ($P_2$). At time $t_3$, a price increase to price $P_3$ is observed that follows the period of price stability. Assuming that the price stability from $t_1$ to $t_2$ and price increase at $t_3$ forms a pattern (e.g., is repeated at another set of times, where $P_1$, $P_2$, and $P_3$ do not deviate beyond a specified amount from prices at the other set of times), then the pattern may be leveraged to fulfill an early termination objective, a completion objective, and/or other objectives with respect to spot instances.

Early Termination Objective

An early termination objective may strive to place a bid for a spot instance that is expected to be terminated early by a provider of the spot instance because the prevailing spot price has increased beyond the bid while the spot instance is running. Thus, free (or reduced rate, depending on the provider) compute time may be obtained during the time when the spot instance was initiated to the time that the spot instance was terminated early.

For example, a start time ($t_i$) and a price ($P_i$) to purchase a spot instance may be identified as part of an early termination objective. $t_i$ may be determined based on an expected runtime of a compute instance that is run using a spot instance. An expected free compute time may be calculated as a difference between $t_3$ and $t_i$ (because the spot instance is expected to start at $t_i$ and terminate early at $t_3$). Longer expected free compute times (e.g., earlier $t_i$) are more likely to run to completion and not terminated early than shorter expected free compute times because longer expected free compute times are more sensitive to inaccuracies of a predicted price increase at $t_3$. Thus, any purchase specification that includes an early termination objective may balance the benefit of longer expected free compute times with the risk of doing so. $P_i$ may be determined based on $P_2$ and $P_3$. For example, $P_i$ may be greater than or equal to $P_2$ and less than $P_3$.

Completion Objective

A completion objective may strive to place a bid for a spot instance that is expected to run to completion. Thus, spot instances, which are typically lower priced but more risky for critical compute instances, may be used for compute instances that may be sensitive to early termination.

For example, a start time ($t_i$) and a price ($P_i$) to purchase a spot instance may be identified as part of a completion objective. $t_i$ may be determined based on an expected runtime of a compute instance that is run using a spot instance and $t_3$. $t_i$ should be less than $t_3$ minus the runtime. In other words, the spot instance should be purchased and initiated such that the spot instance is expected to end before $t_3$. In this manner, the spot instance should be expected to run to completion. Although not illustrated in FIG. 5, a price decrease may occur at $t_3$, in which case the $t_i$ may be extended to be later in time, depending on any next expected price increase beyond $P_i$.

Furthermore, although illustrated with respect to price stability and volatility, any pattern of prices may be identified to fulfill early termination or completion objectives. For example, any pattern in which price increases are observed may be used fulfill early termination objectives.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer implemented method implemented in a computer system having one or more physical processors programmed computer program instructions that, when executed by the one or more physical processors, cause the computer system to perform the method, the method comprising:
    obtaining, by the computer system, one or more requirements associated with a compute instance;
    obtaining, by the computer system, from an analyzer application, a purchase strategy comprising one or more cloud attributes, wherein the analyzer application is configured to:
        measure current cloud attributes of a plurality of cloud service instances from a plurality of cloud service providers, the current cloud attributes comprising at least performance attributes that indicate a performance of one or more cloud service instances,
        maintain a database storing the retrieved cloud attributes of the plurality of cloud service instances,
        analyze the measured attributes; and,
        generate the purchase strategy based on the analysis of the measured attributes;
    identifying, by the computer system, a cloud service instance to run the compute instance based on the purchase strategy and the one or more requirements; and
    generate, by a cloud controller, the compute instance using the identified cloud service instance by modifying the identified cloud instance.

2. The method of claim 1, wherein the one or more cloud attributes further comprise real-time pricing information that includes real-time prices of the one or more cloud service instances.

3. The method of claim 2, wherein the one or more requirements specify a maximum price or a range of prices to be paid for the one or more cloud service instances.

4. The method of claim 1, wherein the current cloud attributes indicate a latency, a throughput, or an amount of packet loss related to the one or more cloud service instances.

5. The method of claim 4, wherein the one or more requirements relate to a required performance of the one or more cloud service instances.

6. The method of claim 1, wherein identifying the cloud service instance comprises:
selecting between a spot instance and a standard instance to purchase based on the one or more requirements.

7. The method of claim 1, wherein identifying a cloud service instance to run the compute instance comprises:
identifying a second plurality of cloud service instances to run the compute instance, wherein the purchase specification specifies the second plurality of cloud service instances that should be purchased to run the compute instance.

8. The method of claim 7, wherein identifying the second plurality of cloud service instances comprises:
selecting the second plurality of cloud service instances from among the one or more cloud service instances;
selecting a third plurality of cloud service instances from among the one or more cloud service instances;
determining that the second plurality of cloud service instances are associated with: (i) a lower total price compared to the third plurality of cloud service instances, and/or (ii) a greater performance compared to the third plurality of cloud service instances.

9. The method of claim 8, wherein creating the compute instance using the identified cloud service instance comprises:
executing, by the computer system, at least a respective portion of a process to run on each of the second plurality of cloud service instances via a cloud service provider that provides a computational resource for the second plurality of cloud service instances.

10. The method of claim 7, wherein a first one of the second plurality of cloud service instances is to be purchased from a first cloud service provider and a second one of the second plurality of cloud service instances is to be purchased from a second cloud service provider different from the first cloud service provider.

11. The method of claim 1, wherein the one or more requirements relate to an early termination objective, the cloud service instance comprises a spot instance, and the one or more cloud attributes relate to historical spot prices, the method further comprising:
identifying a first spot price at a first time and a second spot price higher than the first spot price at a second time based on the historical spot prices;
determining a bid price that is between the first spot price and the second spot price; and
determining a time between the first time and the second time at which the bid price should be made such that the spot instance is expected to run past the second time and be terminated early.

12. The method of claim 11, wherein creating the compute instance using the identified cloud service instance comprises:
executing, by the computer system, a process to run on the spot instance via a cloud service provider that provides a computational resource for the spot instance.

13. The method of claim 1, wherein the one or more requirements relate to a completion objective, the cloud service instance comprises a spot instance, and the one or more cloud attributes relate to historical spot prices, the method further comprising:
identifying a period of price stability based on the historical spot prices, wherein a plurality of prices during the period of price stability are within a lower bound spot price and an upper bound spot price;
determining a bid price that is above or equal to the upper bound spot price; and
determining a time at which the bid price should be made such that the spot instance is expected to run to completion within the period of price stability.

14. The method of claim 13, wherein creating the compute instance using the identified cloud service instance comprises:
executing, by the computer system, a process to run on the spot instance via a cloud service provider that provides a computational resource for the spot instance.

15. The method of claim 1, the method further comprising:
obtaining a subscription to receive one or more purchase strategies from a remote computer system, wherein the purchase strategy is obtained from the remote computer system based on the subscription.

16. The method of claim 1, wherein the purchase strategy is received from a remote computer system, the method further comprising modifying the purchase strategy.

17. A system comprising:
a computer system having one or more processors programmed with computer program instructions that, when executed by the one or more physical processors, cause the computer system to:
obtain one or more requirements associated with a compute instance;
obtain, from an analyzer application, a purchase strategy comprising one or more cloud attributes, wherein the analyzer application is configured to:
measure current cloud attributes of a plurality of cloud service instances from a plurality of cloud service providers, the current cloud attributes comprising at least performance attributes that indicate a performance of one or more cloud service instances
maintain a database storing the retrieved cloud attributes of the plurality of cloud service instances,
analyze the measured attributes, and
generate the purchase strategy based on the analysis of the measured attributes;
identify a cloud service instance to run the compute instance based on the purchase strategy and the one or more requirements; and
generate, by a cloud controller, the compute instance using the identified cloud service instance by modifying the identified cloud instance.

18. The system of claim 17, wherein the one or more cloud attributes further comprise real-time pricing information that includes real-time prices of the one or more cloud service instances.

19. The system of claim 18, wherein the one or more requirements specify a maximum price or a range of prices to be paid for the one or more cloud service instances.

20. The system of claim 17, wherein the current cloud attributes indicate a latency, a throughput, or an amount of packet loss related to the one or more cloud service instances.

21. The system of claim 20, wherein the one or more requirements relate to a required performance of the one or more cloud service instances.

22. The system of claim 17, wherein to identify the cloud service instance, the computer system is further programmed to:
select between a spot instance and a standard instance to purchase based on the one or more requirements.

23. The system of claim 17, wherein to identify a cloud service instance to run the compute instance, the computer system is further programmed to:
identify a second plurality of cloud service instances to run the compute instance, wherein the purchase specification specifies the second plurality of cloud service instances that should be purchased to run the compute instance.

24. The system of claim 23, wherein to identify the second plurality of cloud service instances, the computer system is further programmed to:
select the second plurality of cloud service instances from among the one or more cloud service instances;
select a third plurality of cloud service instances from among the one or more cloud service instances;
determine that the second plurality of cloud service instances are associated with: (i) a lower total price compared to the third plurality of cloud service instances, and/or (ii) a greater performance compared to the second third plurality of cloud service instances.

25. The system of claim 23, wherein a first one of the second plurality of cloud service instances is to be purchased from a first cloud service provider and a second one of the second plurality of cloud service instances is to be purchased from a second cloud service provider different from the first cloud service provider.

26. The system of claim 17, wherein the one or more requirements relate to an early termination objective, the cloud service instance comprises a spot instance, and the one or more cloud attributes relate to historical spot prices, and wherein the computer system is further programmed to:
identify a first spot price at a first time and a second spot price higher than the first spot price at a second time based on the historical spot prices;
determine a bid price that is between the first spot price and the second spot price; and
determine a time between the first time and the second time at which the bid price should be made such that the spot instance is expected to run past the second time and be terminated early.

27. The system of claim 17, wherein the one or more requirements relate to a completion objective, the cloud service instance comprises a spot instance, and the one or more cloud attributes relate to historical spot prices, and wherein the computer system is further programmed to:
identify a period of price stability based on the historical spot prices, wherein a plurality of prices during the period of price stability are within a lower bound spot price and an upper bound spot price;
determine a bid price that is above or equal to the upper bound spot price; and
determine a time at which the bid price should be made such that the spot instance is expected to run to completion within the period of price stability.

28. The system of claim 17, wherein the computer system is further programmed to:
obtain a subscription to receive one or more purchase strategies from a remote computer system, wherein the purchase strategy is obtained from the remote computer system based on the subscription.

29. The system of claim 17, wherein the purchase strategy is received from a remote computer system, wherein the computer system is further programmed to:
modify the purchase strategy.

30. A computer implemented in a computer system having one or more physical processors programmed with computer program instructions that, when executed by the one or more physical processors, cause the computer system to perform the method, the method comprising:
obtaining, by the computer system, one or more requirements associated with a compute instance, wherein the one or more requirements relate to an early termination objective;
obtaining, by the computer system, a purchase strategy comprising one or more cloud attributes associated with one or more cloud service instances, wherein the one or more cloud attributes relate to historical spot prices identifying a first spot price at a first time and a second spot price higher than the first spot price at a second time based on the historical spot prices, wherein the analyzer application is configured to:
measure current cloud attributes of a plurality of cloud service instances from a plurality of cloud service providers, the current cloud attributes comprising at least performance attributes that indicate a performance of one or more cloud service instances
maintain a database storing the retrieved cloud attributes of the plurality of cloud service instances,
analyze the measured attributes, and
generate the purchase strategy based on the analysis of the measured attributes;
determining a bid price that is between the first spot price and the second spot price;
identifying, by the computer system, a cloud service instance to run the compute instance based on the time and the bid price, wherein the cloud service instance comprises a spot instance;
determining a time between the first time and the second time at which the bid price should be made such that the spot instance is expected to run past the second time and be terminated early; and
generate, by a cloud controller, the compute instance using the identified cloud service instance by modifying the identified cloud instance.

31. The method of claim 30, wherein creating a compute instance using the identified cloud service instance comprises:
executing, by the computer system, a process to run on the identified cloud service instance via a cloud service provider that provides a computational resource for the identified cloud service instance.

32. A computer implemented method implemented in a computer system having one or more physical processors programmed with computer program instructions that, when executed by the one or more physical processors, cause the computer system to perform the method, the method comprising:
obtaining, by the computer system, one or more requirements associated with a compute instance, wherein the one or more requirements relate to a completion objective;
obtaining, by the computer system, from an analyzer application, a purchase strategy comprising one or more cloud attributes associated with one or more cloud service instances, wherein the one or more cloud attributes relate to historical spot prices, wherein the analyzer application is configured to:
measure current cloud attributes of a plurality of cloud service instances from a plurality of cloud service providers, the current cloud attributes comprising at least performance attributes that indicate a performance of one or more cloud service instances
maintain a database storing the retrieved cloud attributes of the plurality of cloud service instances, analyze the measured attributes, and
generate the purchase strategy based on the analysis of the measured attributes;
identifying a period of price stability based on the historical spot prices, wherein a plurality of prices during the period of price stability are within a lower bound spot price and an upper bound spot price;
determining a bid price that is above or equal to the upper bound spot price;
identifying, by the computer system, a cloud service instance to run the compute instance based on the time and the bid price, wherein the cloud service instance comprises a spot instance;
determining a time at which the bid price should be made such that the spot instance is expected to run to completion within the period of price stability; and
generate, by a cloud controller, the compute instance using the identified cloud service instance by modifying the identified cloud instance.

* * * * *